(12) United States Patent
Ichimura (10) Patent No.: US 8,111,595 B2
(45) Date of Patent: Feb. 7, 2012

(54) OPTICAL DISK RECORDING AND PLAYBACK APPARATUS AND SIGNAL DETECTION METHOD UTILIZING A DIFFERENTIAL PUSH-PULL METHOD AND A PHASE DIFFERENCE METHOD

(75) Inventor: Isao Ichimura, Tokyo (JP)

(73) Assignee: Sony Corporation, Tokyo (JP)

( * ) Notice: Subject to any disclaimer, the term of this patent is extended or adjusted under 35 U.S.C. 154(b) by 969 days.

(21) Appl. No.: 11/092,907

(22) Filed: Mar. 30, 2005

(65) Prior Publication Data
US 2005/0226108 A1 Oct. 13, 2005

(30) Foreign Application Priority Data
Mar. 31, 2004 (JP) ................................. 2004-103030

(51) Int. Cl.
*G11B 7/00* (2006.01)
(52) U.S. Cl. ............... 369/44.26; 369/44.29; 369/44.37; 369/53.31
(58) Field of Classification Search ............... 369/44.41, 369/47.25, 53.35, 124.12
See application file for complete search history.

(56) References Cited

U.S. PATENT DOCUMENTS

| | | | | |
|---|---|---|---|---|
| 4,829,499 A * | 5/1989 | Abe | ........................... | 369/59.15 |
| 6,144,625 A * | 11/2000 | Kuroda et al. | ............. | 369/44.27 |
| 6,438,098 B1 * | 8/2002 | Nakajima et al. | .......... | 369/275.4 |
| 6,487,149 B1 * | 11/2002 | Yokoi et al. | ................. | 369/47.25 |
| 6,560,172 B1 * | 5/2003 | Nakajo | ....................... | 369/44.13 |
| 6,603,720 B1 * | 8/2003 | Kuroda et al. | ............. | 369/53.23 |
| 6,747,922 B2 * | 6/2004 | Kamiyama | ................ | 369/44.28 |
| 6,937,542 B1 * | 8/2005 | Ogawa | ....................... | 369/44.13 |
| 7,038,980 B2 * | 5/2006 | Tsuchiya et al. | ........... | 369/44.32 |
| 7,050,363 B2 * | 5/2006 | Otsuka et al. | .............. | 369/44.13 |
| 7,095,693 B2 * | 8/2006 | Sasaki et al. | ............... | 369/53.15 |
| 7,116,612 B2 * | 10/2006 | Ogasawara et al. | ........ | 369/44.37 |
| 7,164,630 B2 * | 1/2007 | Nakane et al. | ............. | 369/44.32 |
| 7,187,638 B2 * | 3/2007 | Tsai et al. | .................. | 369/53.32 |
| 2002/0048235 A1 * | 4/2002 | Park | ......................... | 369/44.25 |
| 2003/0035350 A1 * | 2/2003 | Ogasawara et al. | ........ | 369/44.23 |
| 2003/0067849 A1 * | 4/2003 | Mikami | ..................... | 369/44.25 |
| 2004/0066715 A1 * | 4/2004 | Buchler | ..................... | 369/44.29 |
| 2004/0109396 A1 * | 6/2004 | Nakano et al. | ............. | 369/44.25 |
| 2004/0125725 A1 * | 7/2004 | Kamioka et al. | ........... | 369/53.34 |
| 2005/0025015 A1 * | 2/2005 | Horibata | ...................... | 369/53.3 |
| 2005/0052960 A1 * | 3/2005 | Park et al. | .................. | 369/44.25 |

FOREIGN PATENT DOCUMENTS

| | | |
|---|---|---|
| JP | 8-194969 | 7/1996 |
| JP | 11-167731 | 6/1999 |
| JP | 11-312319 | 11/1999 |
| JP | 2002-117536 | 4/2002 |
| JP | 2002-269780 | 9/2002 |
| JP | 2003-173540 | 6/2003 |

* cited by examiner

*Primary Examiner* — Will J Klimowicz
*Assistant Examiner* — Mark Fischer
(74) *Attorney, Agent, or Firm* — Oblon, Spivak, McClelland, Maier & Neustadt, L.L.P.

(57) ABSTRACT

An optical disc recording and playback apparatus includes an optical pickup performing an operation for recording and playing back signal information into and from an optical disc; an optical element allowing a light beam irradiated onto an optical disc by the optical pickup to be split into a main beam and sub-beams on both sides of the main beam and supplying the beams to the optical disc; an optical detector detecting return light from the optical disc; and a computation circuit detecting a track control error signal by a phase difference method and a differential push-pull method by using the detection signal from the optical detector and also detecting a wobble signal.

8 Claims, 9 Drawing Sheets

OPTICAL DISK RECORDING AND PLAYBACK APPARATUS AND SIGNAL DETECTION METHOD UTILIZING A DIFFERENTIAL PUSH-PULL METHOD AND A PHASE DIFFERENCE METHOD

CROSS REFERENCES TO RELATED APPLICATIONS

The present invention contains subject matter related to Japanese Patent Application JP 2004-103030 filed in the Japanese Patent Office on Mar. 31, 2004, the entire contents of which are incorporated herein by reference.

BACKGROUND OF THE INVENTION

1. Field of the Invention

The present invention relates to an optical disc recording and playback apparatus capable of accurately detecting a specific information signal from a wobbling (meandering) shape provided in guide grooves and information pit sequences on an optical disc medium and to a signal detection method for use with the optical disc recording and playback apparatus.

2. Description of the Related Art

Hitherto, in rewritable optical discs, such as CD-Rs and DVD-RWs, guide grooves are formed in such a manner as to wobble (meander), and track address information and a reference timing signal for generating a writing clock signal are superposed by using this wobble. Furthermore, in read-only optical discs, attempts to superpose an electronic watermark, such as copyright information, by arranging information pit sequences so as to wobble, have been made.

As a method for accurately detecting an information signal (hereinafter referred to as a "wobble signal") recorded by such a wobble, it is disclosed in U.S. Pat. No. 5,339,302 that, for example, based on output obtained by difference signal detection means formed of a two-division light-receiving element, gain control is performed so that the detection output of each of the divided light-receiving elements becomes equal. This method has the effect of preventing a phenomenon in which, when a gradient occurs between an objective lens and an optical disc or when there is an error at the position where a light-receiving element is mounted, residual components occur in the difference between detection signals of the two-divided light-receiving elements, and leakage due to recording marks occurs in the wobble detection signal after recording, causing S/N of the playback signal to deteriorate.

With similar purposes, a method of reducing influences of a recording signal by subtracting detection output in each light-receiving element of the two-division light-receiving element after the detection output is normalized by an RF signal such that the outputs of the two-division light-receiving element are added together has been proposed in, for example, U.S. Pat. No. 5,459,706.

Another method has been proposed in, for example, U.S. Pat. No. 6,487,149, in which a wobble signal is detected by using a four-division light-receiving element, which is divided in a direction tangent to the tracks and in a direction at right angles to the tangent line, and when prepits (LPP) recorded in intermediate portions (so-called land portions) of mutually adjacent grooves, and recording marks are to be played back, influences on the wobble signal are reduced.

SUMMARY OF THE INVENTION

However, in a recordable optical disc, the main purpose of all the methods of the related art is to prevent a wobble signal, such as a track address and time information for generating a clock signal, which is superposed in the groove portion formed in a continuous groove shape, from being influenced due to the existence of signal marks.

Therefore, in the methods of the related art, with respect to a read-only (ROM) optical disc in which a wobble signal, such as a watermark, is superposed onto an information pit sequence formed of intermittent hole shape arrangements, it is difficult to effectively eliminate influences due to information pits and recording marks, and it is sometimes difficult to accurately detect the wobble signal.

Accordingly, it is desirable to provide an optical disc recording and playback apparatus capable of eliminating influences due to information pits and recording marks and reliably detecting a wobble signal with respect to an optical disc in which an information signal such as a watermark is superposed by a wobbled information pit sequence in addition to an optical disc in which an information signal such as an address and time information is superposed by a wobbled groove, and a signal detection method for use with the optical disc recording and playback apparatus.

According to an embodiment of the present invention, there is provided an optical disc recording and playback apparatus including: an optical pickup performing an operation for recording and playing back signal information into and from an optical disc; an optical element allowing a light beam irradiated onto an optical disc by the optical pickup to be split into a main beam and sub-beams on both sides of the main beam and supplying the beams to the optical disc; an optical detector detecting return light from the optical disc; and a computation circuit detecting a track control error signal by a phase difference method and a differential push-pull method by using the detection signal from the optical detector and also detecting a wobble signal, wherein the optical detector includes a four-division light-receiving element detecting return light of the main beam by light-receiving areas divided at least in a direction tangent to the tracks of the optical disc and in the radial direction of the optical disc, and two two-division light-receiving elements, disposed on both sides of the four-division light-receiving element, detecting return light of the sub-beams by the light-receiving areas divided at least in the direction tangent to the tracks, and the computation circuit includes normalization means normalizing a pit playback signal from each light-receiving area in the four-division light-receiving element of the optical detector to a fixed value, and computes the wobble signal and a track control error signal by the phase difference method by using the normalized pit playback signal.

According to another embodiment of the present invention, there is provided a signal detection method for use with an optical disc recording and playback apparatus including: an optical pickup performing an operation for recording and playing back signal information into and from an optical disc; an optical element allowing a light beam irradiated onto an optical disc by the optical pickup to be split into a main beam and sub-beams on both sides of the main beam and supplying the beams to the optical disc; an optical detector detecting return light from the optical disc; and a computation circuit detecting a track control error signal using a phase difference method and a differential push-pull method by using the detection signal from the optical detector and also detecting a wobble signal, wherein the optical detector includes a four-division light-receiving element detecting return light of the main beam by light-receiving areas divided at least in a direction tangent to the tracks of the optical disc and in the radial direction of the optical disc, and two two-division light-receiving elements, disposed on both sides of the four-division light-receiving element, detecting return light of the sub-beams by the light-receiving areas divided at least in the direction tangent to the tracks, the signal detection method including the steps of: normalizing a pit playback signal from each light-receiving area in the four-division light-receiving element of the optical detector to a fixed value; and computing a track control error signal on the basis of the wobble signal and the phase difference method by using the normalized pit playback signal.

In the optical disc recording and playback apparatus and the signal detection method according to the embodiments of the present invention, the optical detector for detecting return light from an optical disc includes a four-division light-receiving element for detecting return light of the main beam by light-receiving areas divided at least in a direction tangent to the tracks of the optical disc and in the radial direction of the optical disc, and two two-division light-receiving elements, disposed on both sides of the four-division light-receiving element, for detecting return light of the sub-beams by the light-receiving areas divided at least in the direction tangent to the tracks. A pit playback signal from each light-receiving area in the four-division light-receiving element of the optical detector is normalized to a fixed value. A wobble signal and a track control error signal using the phase difference method are computed by using the normalized pit playback signal. As a result, influences due to information pits and recording marks can be eliminated, and the wobble signal can be reliably detected.

Therefore, there are the advantages in that influences due to information pits and recording marks can be eliminated and a wobble signal can be reliably detected with respect to an optical disc in which an information signal such as a watermark is superposed by a wobbled information pit sequence in addition to an optical disc in which an information signal such as an address and time information is superposed by a wobbled groove.

DESCRIPTION OF THE PREFERRED EMBODIMENTS

In an optical disc recording and playback apparatus and a signal detection method for use with the optical disc recording and playback apparatus according to embodiments of the present invention, an optical detector for detecting return light from an optical disc is provided with a four-division light-receiving element for detecting return light of a main beam (0th order diffraction light) by light-receiving areas divided at least in a direction tangent to the tracks of the optical disc and in the radial direction of the optical disc, and two two-division light-receiving elements, disposed on both sides of the four-division light-receiving element, for detecting return light of sub-beams (±1st order diffraction light) by light-receiving areas divided at least in the direction tangent to the tracks.

In a system for processing signals from the four-division light-receiving element of the optical detector, an AGC circuit for normalizing a pit playback signal from each light-receiving area of the four-division light-receiving element to a fixed value is provided, and the pit playback signal normalized by the AGC circuit is computed by an operational amplifier, etc. As a result, by computing a wobble signal and a track control error signal using a phase difference method, influences due to information pits and recording marks are eliminated, and the wobble signal is reliably detected.

Figure 1:
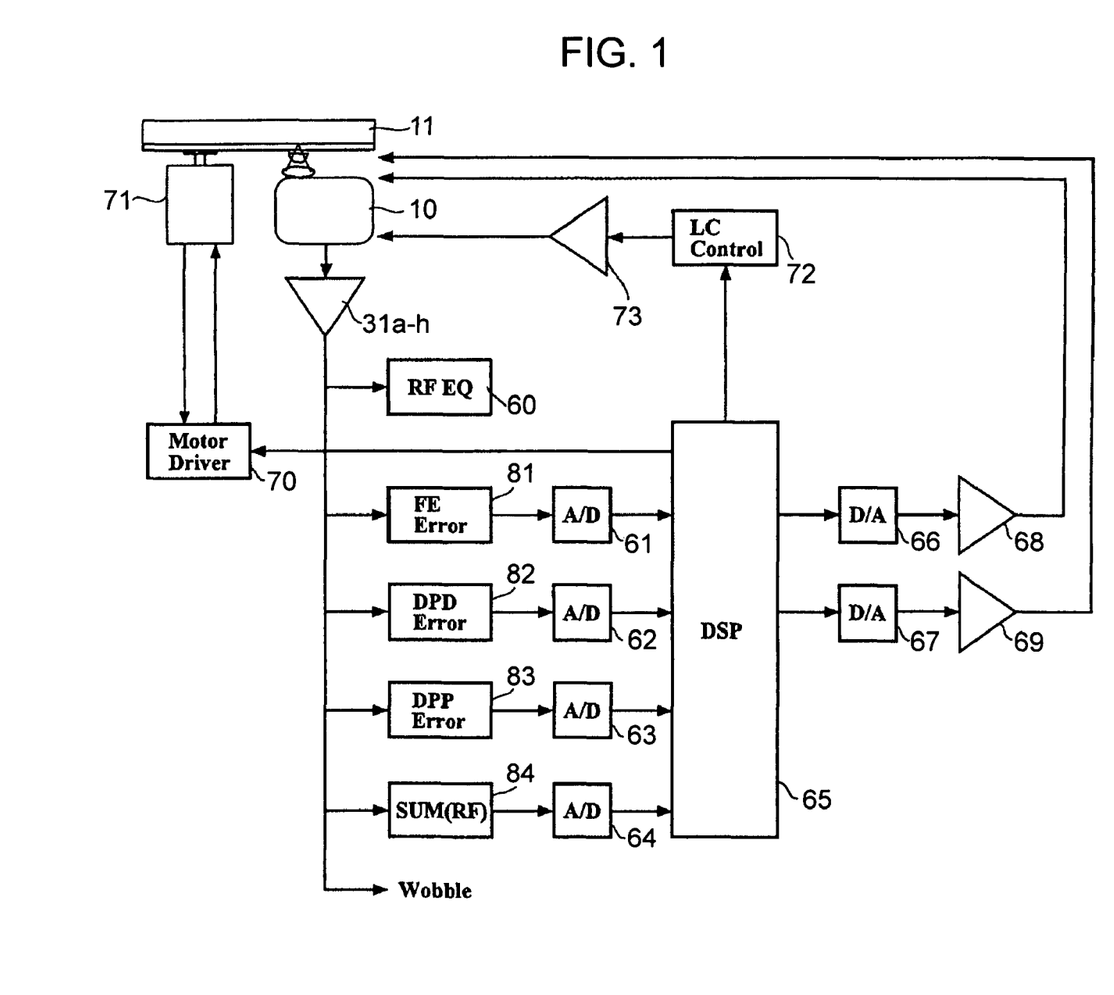
FIG. 1 is a block diagram showing an example of the overall configuration of an optical disc recording and playback apparatus according to an embodiment of the present invention.
Figure 2:
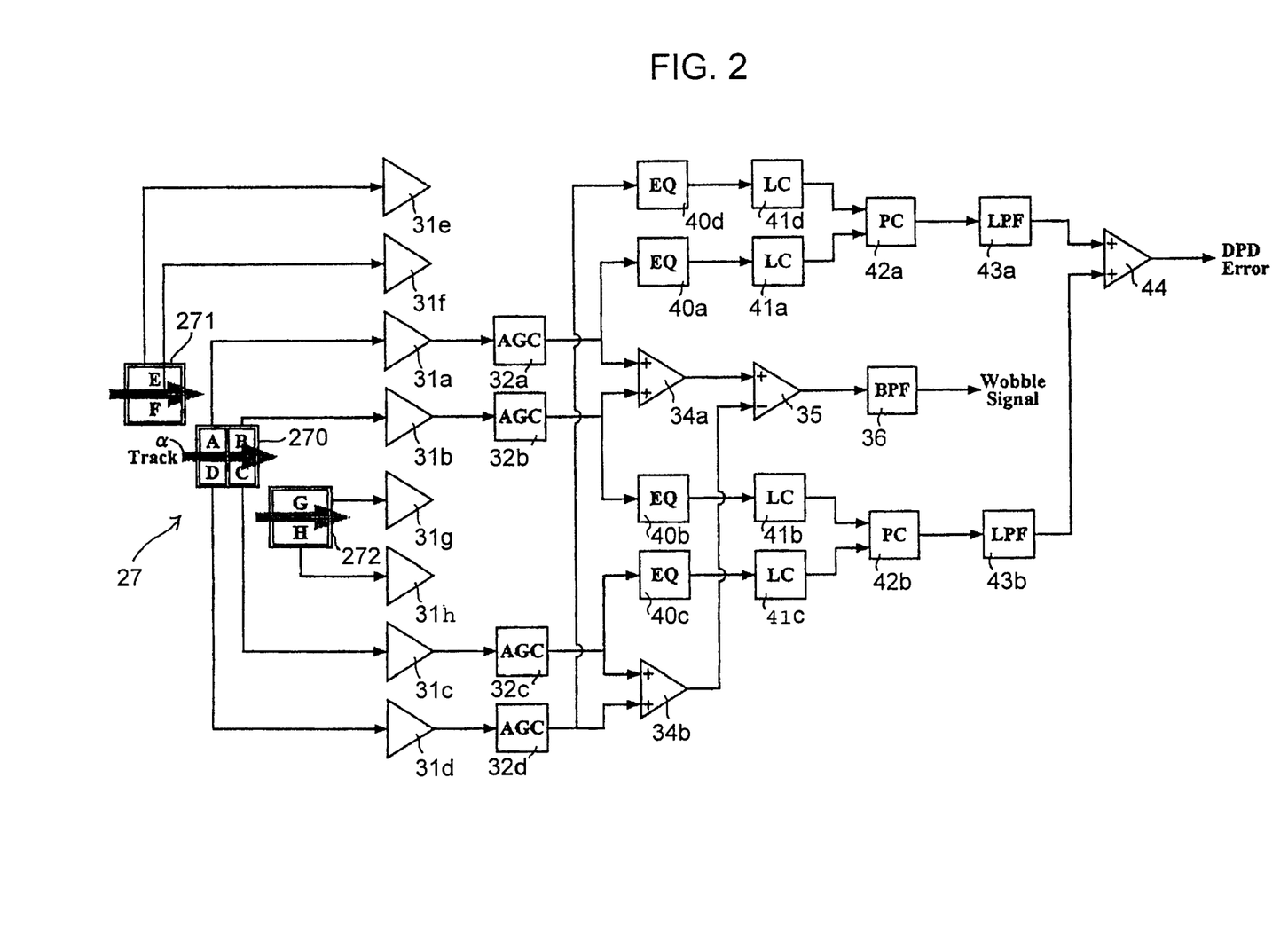
FIG. 2 is a block diagram showing an example of the configuration of an optical pickup for detecting a DPD signal and wobbles in the optical disc recording and playback apparatus shown in FIG. 1.

FIG. 1 is a block diagram showing an example of the overall configuration of the optical disc recording and playback apparatus according to an embodiment of the present invention. FIG. 2 is a block diagram showing an example of the configuration of an optical pickup of the optical disc recording and playback apparatus shown in FIG. 1. Also, FIG. 2 mainly shows the configuration when a track error signal and a wobble signal are detected by the phase difference method (DPD).

Figure 3:
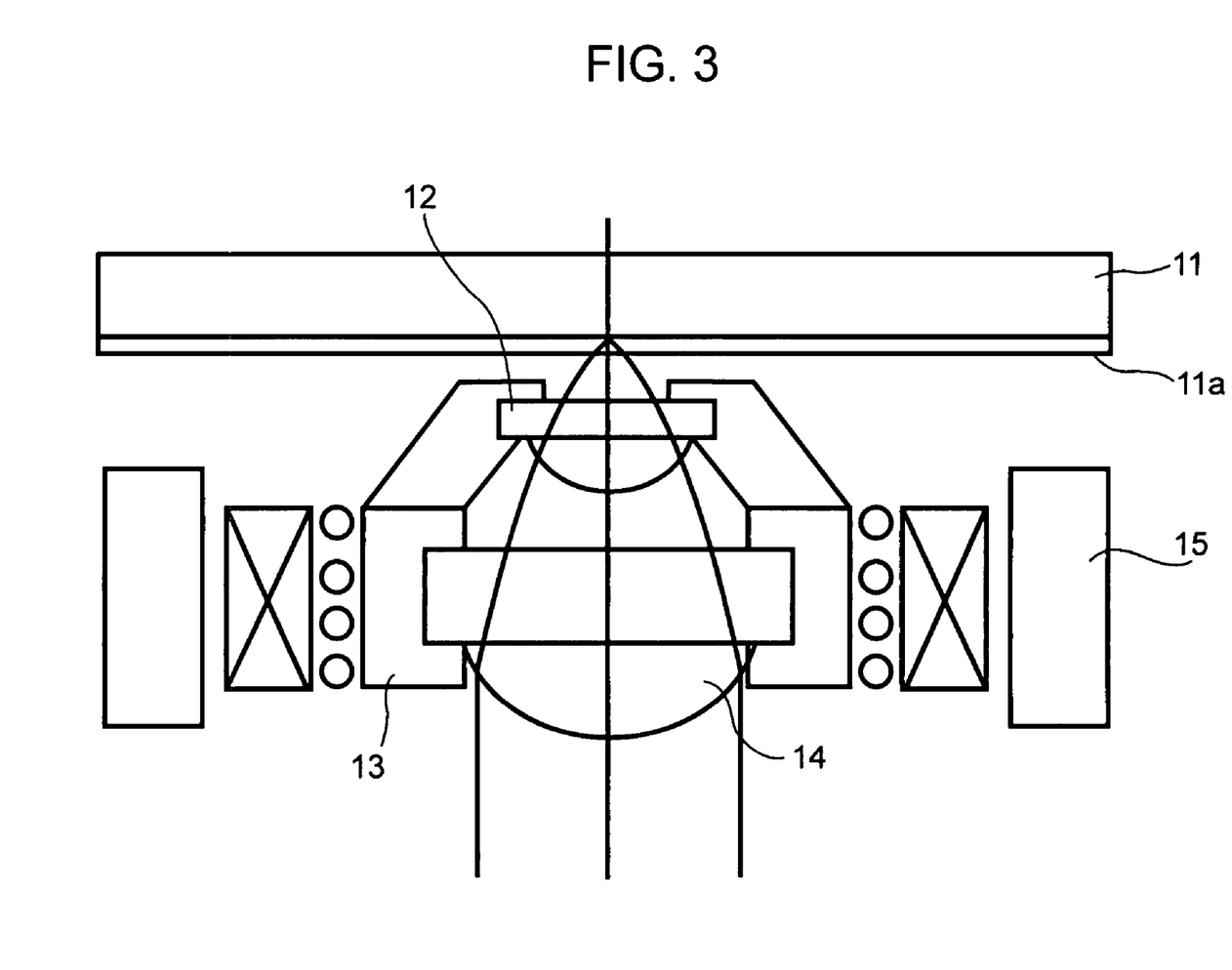
FIG. 3 is a sectional view showing an example of the configuration of an objective lens drive section of the optical disc recording and playback apparatus shown in FIG. 1.
Figure 4:
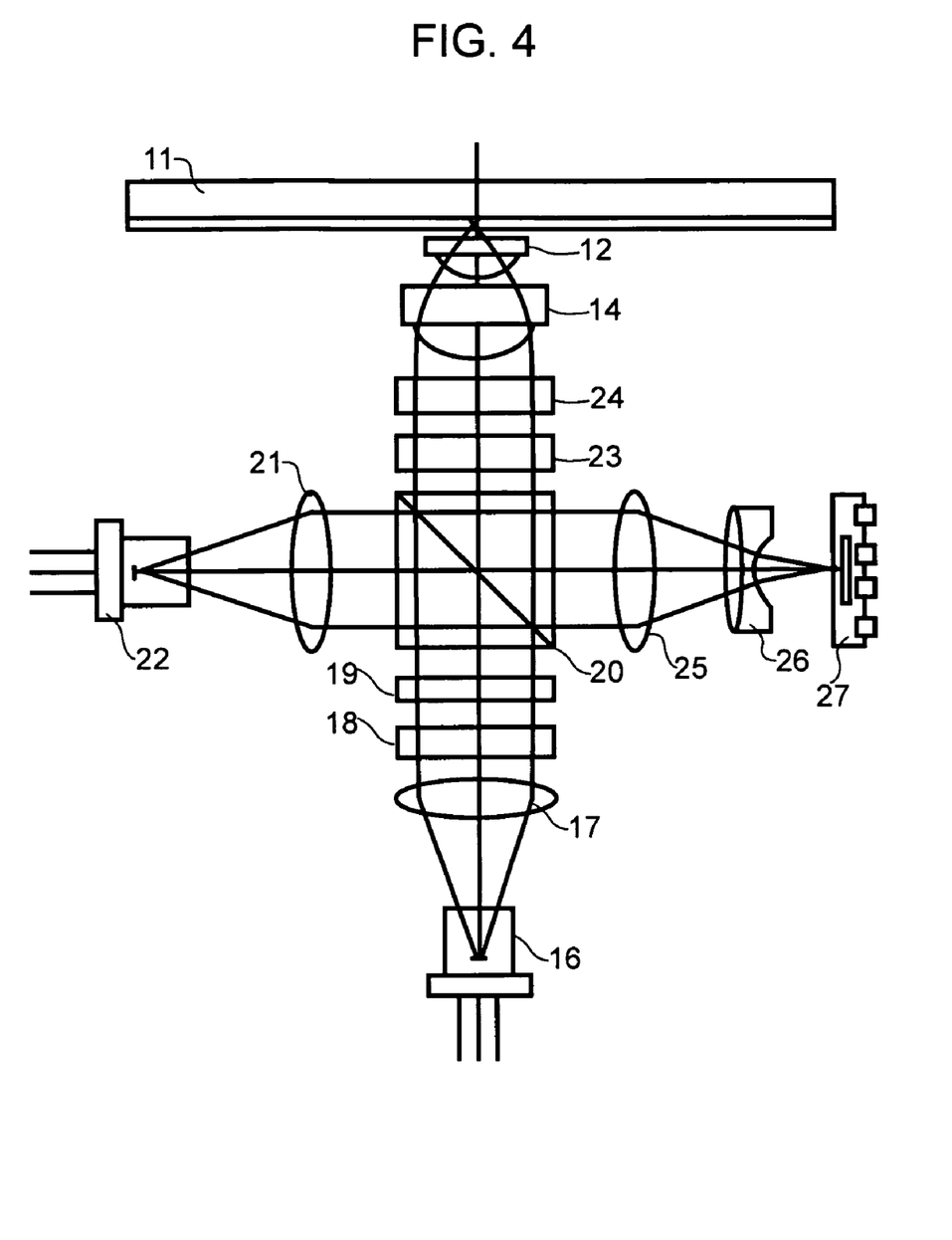
FIG. 4 is a sectional view showing an example of the configuration of an optical pickup system in the optical disc recording and playback apparatus shown in FIG. 1.
Figure 5:
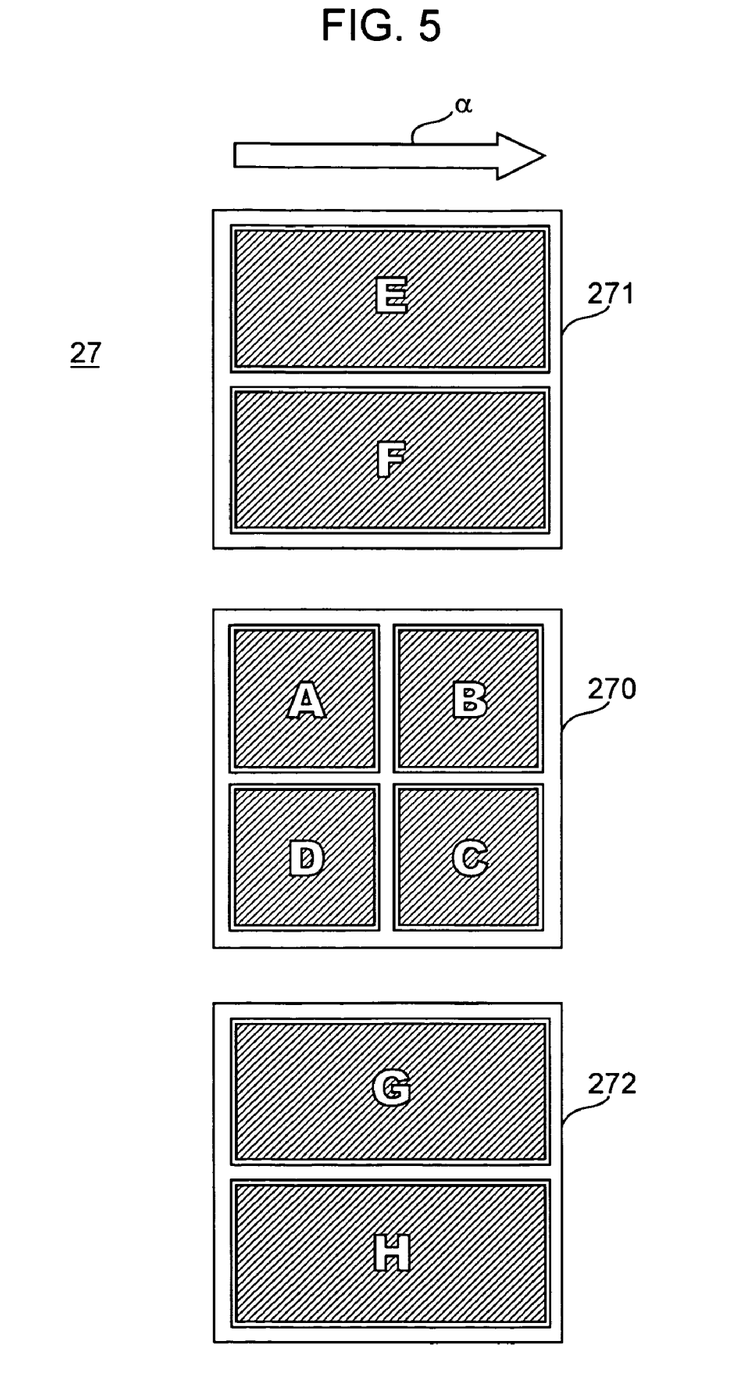
FIG. 5 is a sectional view showing an example of the configuration of a divided light-receiving element of an optical detector in the optical disc recording and playback apparatus shown in FIG. 1.

FIG. 3 is a sectional view showing an objective lens drive section of the optical disc recording and playback apparatus shown in FIG. 1 and an optical disc. FIG. 4 is a sectional view showing an example of the configuration of an optical pickup for playing back an optical disc of the recording and playback apparatus shown in FIG. 1. FIG. 5 is an enlarged plan view showing the configuration of divided light-receiving elements provided in the optical disc recording and playback apparatus shown in FIG. 1.

The optical disc recording and playback apparatus according to this embodiment shows an example of an optical system used in an optical disc recording and playback apparatus using a two-group objective lens with an aperture number 0.85 and a blue-violet semiconductor laser light source having a wavelength of 405 nm. This embodiment is described below with emphasis on a method for detecting a wobble signal and a track control error signal of an optical disc used in such an optical disc recording and playback apparatus.

First, referring to FIG. 3, a two-group objective lens for an optical disc in this embodiment is described. As shown in FIG. 3, an objective lens drive section according to this embodiment includes a first lens 12 and a second lens 14 forming a two-group objective lens, a lens holder 13, a two-axis electromagnetic actuator 15, and so on, and is arranged so as to face and in proximity with the signal recording surface of an optical disc 11.

The second lens 14 is mounted on the two-axis electromagnetic actuator 15 having such a configuration as to be movable in the direction of the optical axis and in the direction at right angles to the signal tracks (the tangent line). The first lens 12 is held by the lens holder 13 so that the first lens 12 is positioned in the same optical axis as that of the second lens 14, and these two lenses 12 and 14 are integrated to function as a two-group objective lens having an aperture number 0.85. Beams from the semiconductor laser light source (not shown in FIG. 3) pass through these two lenses and are thereby collected on the optical disc 11.

As the aperture number of the objective lens increases, in general, the disc gradient permittivity in the optical disc recording and playback apparatus decreases. Therefore, in order to obtain gradient permittivity that is almost comparable to that of a DVD (Digital Versatile Disc), also in an optical disc recording and playback apparatus in which the lens aperture number is increased to 0.85, a technique for making the thickness of a light transparent protective layer (cover layer) 11a thin to approximately 0.1 mm has been proposed.

Next, referring to FIG. 4, the configuration of an optical pickup for playing back an optical disc is described.

Initially, beams emitted from a semiconductor laser 16 are made to be parallel beams by a collimator lens 17 and pass through a diffraction grating 19 for generating sub-beams (±1st order diffraction light) used to generate a track control error signal. Thereafter, the beams are collected onto the optical disc 11 by the two-group objective lenses 12 and 14.

Then, after some of the emitted light is reflected by a polarized beam splitter 20, the light is guided to an optical detector 22 by a light collection lens 21, and the light is used for the purpose of controlling the laser output to a fixed value. The quantity of light incident onto the optical detector 22 can be adjusted by rotating a half-wavelength plate 18, and the actual laser output is controlled to any desired light emission output value by an APC (automatic power control) circuit (not shown).

Furthermore, a liquid-crystal element 23 has a concentric electrode pattern and serves the role of correcting spherical aberration that occurs due to the thickness error of the cover layer in response to the voltage applied to each electrode. In front of the two-group lens, a quarter-wavelength plate 24 for converting linearly polarized light into circularly polarized light is arranged.

On the other hand, the light reflected from the optical disc 11 is reflected by the beam splitter 20, and thereafter is guided to the detection light path. In this example, for a focus control error signal, an astigmatism method is used, and for a track control error signal, a phase difference method (see, for example, U.S. Pat. No. 4,520,469) and a differential push-pull method (see, for example, U.S. Pat. No. 4,775,968) are used. The converging light that passes through a light collection lens 25 and a multiple lens 26 enters an optical detector 27 for detecting a servo error signal and an RF signal, and a photoelectric conversion is performed thereon.

The optical detector 27, as shown in FIG. 5, includes one four-division light-receiving element 270 and two two-division light-receiving elements 271 and 272. The four-division light-receiving element 270 has four divided light-receiving areas A to D, which are arranged in such a manner as to be divided into four portions in the direction tangent to the tracks indicated by the arrow α and in the direction at right angles thereto (in the radial direction of the optical disc). Each of the divided light-receiving areas A to D has wide-band characteristics, and the light-receiving area A and the light-receiving area D are in a positional relationship of facing each other with respect to the direction tangent to the tracks, and the light-receiving area B and the light-receiving area C are in a positional relationship of facing each other with respect to the direction tangent to the tracks.

The two-division light-receiving elements 271 and 272 are arranged on both sides of the four-division light-receiving element 270 in the direction at right angles to the direction tangent to the tracks with the four-division light-receiving element 270 in between. The two-division light-receiving element 271 has two divided light-receiving areas E and F, which are divided into two portions and arranged in the direction at right angles to the direction tangent to the tracks. Also, the two-division light-receiving element 272 has two divided light-receiving areas G and H, which are divided into two portions and arranged in the direction at right angles to the direction tangent to the tracks.

Of the illumination light divided into three beams, that is, 0th order light (main beam) and ±1st order light (sub-beams), by the diffraction grating 19, the reflected light, which is the 0th order light, is received by the light-receiving areas A to D, and the reflected light, which is the ±1st order light, is received by the light-receiving areas E to H.

Based on the outputs of these light-receiving areas A to H, a focus control error signal FE, a phase difference signal DPD (Differential Phase Detection Method) serving as a track control error signal, and a differential push-pull error signal DPP (Differential Push-Pull Detection Method) are computed.

Next, a description is given, with reference to FIG. 2, of the configuration of the optical pickup in the optical disc recording and playback apparatus according to this embodiment.

As shown in FIG. 2, the optical pickup includes head amplifiers 31a to 31h for amplifying a detection signal from each divided light-receiving area of the optical detector 27; automatic gain controllers (AGC) 32a to 32d for automatically adjusting the gain of a detection signal from the four-division light-receiving element 270; equalizers (EQ) 40a to 40d for shaping the waveform of a signal from each of the AGC circuits 32a to 32d; operational amplifiers 34a and 34b for adding together the output signals of the AGC circuit 32a and 32b and the output signals of the AGC circuit 32c and 32d, respectively; an operational amplifier 35 for computing the difference between the outputs of the operational amplifiers 34a and 34b; a band-pass filter (BPF) 36 for allowing a predetermined frequency band signal from the output of the operational amplifier 35 to pass through; level comparators (LC) 41a to 41d for comparing the output signals from the equalizers 40a to 40d with a reference value and for binarizing the comparison result; phase comparators (PC) 42a and 42b for comparing the phases of the output signals of the two level comparators 41a and 41d and the phases of the output signals of the two level comparators 41b and 41c, respectively; low-pass filters 43a and 43b for cutting off high-frequency signals of the output signals of the phase comparators 42a and 42b; and an operational amplifier 44 for adding together the output signals of the low-pass filters 43a and 43b.

Next, the operation of such an optical pickup is described.

A playback signal read from the optical disc 11 by the optical system shown in FIGS. 3 to 5 is input to the head amplifiers 31a to 31h. Each of the head amplifiers 31a to 31h photoelectrically converts the playback signal (here, the quantity of the received light in each divided light-receiving area shown in FIG. 5) from the optical system and amplifies the signal to a predetermined level necessary for processing at the subsequent stage.

Thereafter, the outputs of the head amplifiers 31a to 31d corresponding to the areas A to D of the light-receiving element 270, respectively, among the head amplifier outputs are supplied to the AGC circuits 32a to 32d, where adjustments are made so that the received light intensity or the playback signal amplitude becomes equal to the indicated voltage.

Figure 6:
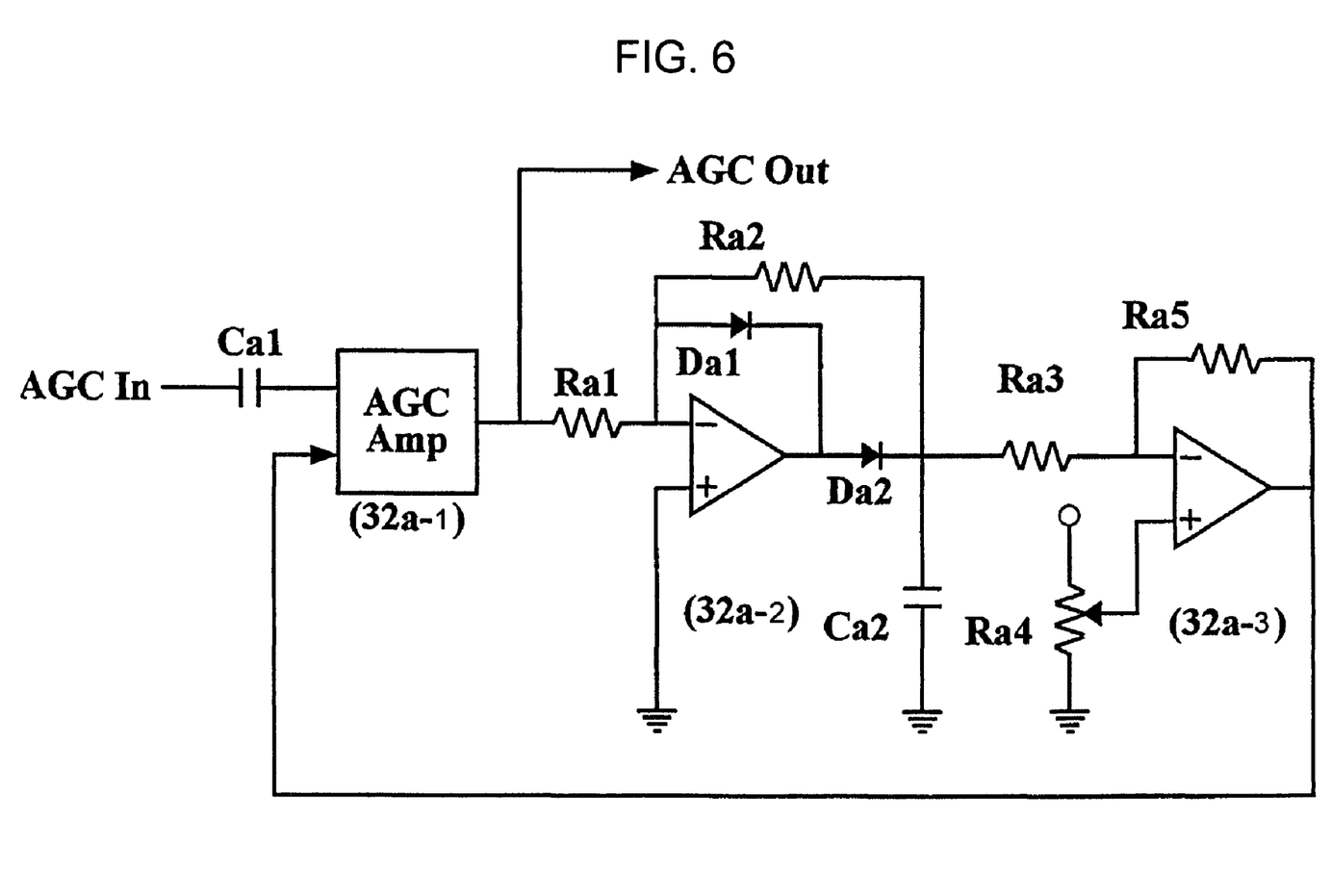
FIG. 6 is a circuit diagram showing an example of the configuration of an AGC amplifier circuit of the optical disc recording and playback apparatus shown in FIG. 1.

FIG. 6 is a circuit diagram showing an example of the configuration of the AGC circuit (part 32a) for detecting the amplitude of the playback signal by a half-wave rectifier circuit and for controlling that the amplitude of the playback signal becomes equal to a reference voltage.

The DC components of the output of the head amplifier 31a are cut off by a capacitor Ca1, and thereafter are supplied to an AGC amplifier 32a-1 inside the AGC circuit 32a. The half-wave rectifier circuit includes a wide-band operational amplifier 32a-2, two resistors Ra1 and Ra2, two diodes Da1 and Da1, and a capacitor Ca2. A detected voltage value is connected to the minus input terminal of another operational amplifier 32a-3 via a resistor Ra3, and the reference voltage generated by a variable resistor Ra4 is connected to the plus input terminal thereof.

As a result of setting the feedback resistor Ra5 of the operational amplifier 32a-9 at the condition Ra5>>Ra3, an AGC amplifier having a sufficient gain is formed, and the amplitude value of the playback signal is typically maintained at a fixed value. As a result of identical processing also being performed in the other AGC circuits 32b to 32d, the outputs of the light-receiving areas A to D of the four-division light-receiving element 270 are normalized so as to become a fixed playback signal amplitude. Although, in this embodiment, a method of detecting the signal amplitude by half-wave rectification is shown as an example, another amplitude detection method, such as a full-wave rectification method, can also be used.

Furthermore, a method of performing automatic gain adjustments so that the light-receiving intensities of the four-division light-receiving element 270 become equal can also be easily realized.

The detection of the wobble signal is realized in such a way that the signal such that the outputs of the AGC circuit 32c and the AGC circuit 32d are added together using the operational amplifier 34b is subtracted from the signal such that the outputs of the AGC circuit 32a and the AGC circuit 32b are added together using the operational amplifier 34a, and the output is made to pass through a band pass filter 36 that allows only the wobble signal to pass through. The use of this technique has the effect of preventing a phenomenon in which, when a gradient occurs between the objective lens and the optical disc or when there is an error at the position where a light-receiving element is mounted, residual components resulting from the playback signal occur in the difference between the light-receiving signals of the four-division light-receiving element 270, causing S/N of the wobble signal to deteriorate.

Next, a description is given of a method of detecting a track control error signal using a phase difference method.

In FIG. 2, the output of the AGC circuit 32a passes through an equalizer 40a, is thereafter binarized by a comparator 41a, and is input to a phase comparator 42a. Similarly, the output of the AGC circuit 32d passes through an equalizer 40d, is thereafter binarized by a comparator 41d, and is input to the phase comparator 42a.

In the phase comparator 42a, the phase difference between these two input signals is detected. The situation is shown in FIG. 7.

Figure 7:
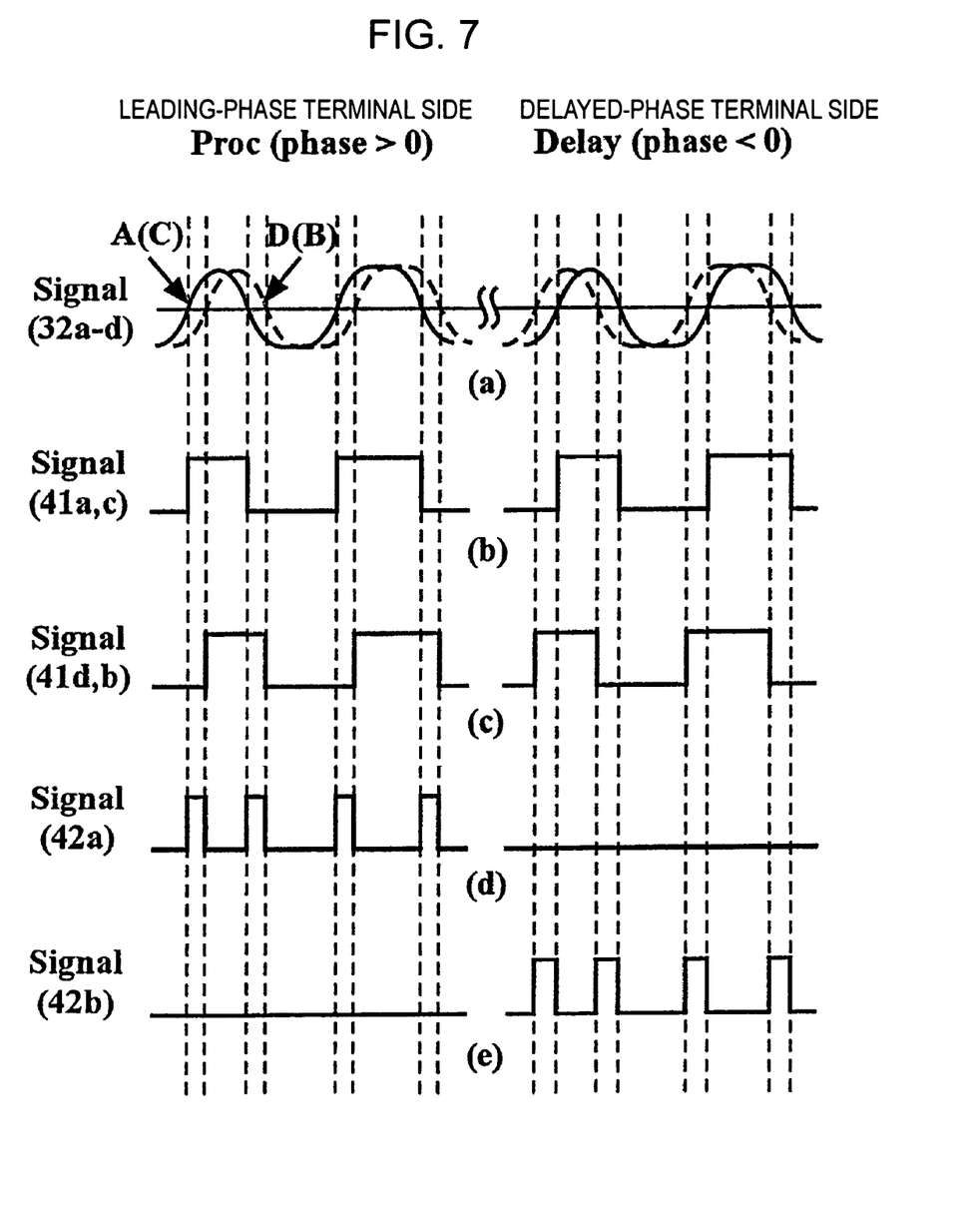
FIG. 7 is a waveform chart showing a phase difference detection process of a phase comparator of the optical disc recording and playback apparatus shown in FIG. 1.

As shown in FIG. 7, when the phase of the input of the light-receiving area A leads the phase of the input of the light-receiving area D, as shown in part (d) of FIG. 7, a logical signal corresponding to the phase difference is output to the leading phase terminal (Proc) side, and the delayed phase terminal (Delay) side maintains the zero level.

On the other hand, when the phase of the input of the light-receiving area A is delayed with respect to the input of the light-receiving area D, as shown in part (e) of FIG. 7, a logical signal corresponding to the phase difference is output to the delayed phase terminal side, and the leading phase terminal side becomes a zero level. Therefore, by making both the outputs in the phase comparator 42a pass through a low-pass filter (LPF) 43a and thereafter computing the difference by an operational amplifier 44a, a phase difference error signal between the light-receiving areas A and D is obtained.

Similarly, the phase difference error signal between the light-receiving areas B and C can be obtained by using the outputs of the AGC circuits 32b and 32c. By adding together the phase difference error signals, a phase difference (DPD) error signal using the four-division light-receiving element is computed. In addition, the use of the technique of this example makes it possible to prevent variations of the error signal that occurs due to the variations of the reflectivity of the optical disc and differences in signal amplitude.

When the wobble signal is detected, as a result of using the technique of this example, influences of pit signals and recording marks can be reduced. However, in order to improve S/N of the wobble signal, a technique for sampling the light-receiving signal of only the portion where information pits or recording marks exist or of only the portion where information pits or recording marks do not exist is effective.

As an example, an optical disc in which information pits are wobbled is considered. In this case, unlike the optical disc in which a continuous groove is wobbled, wobble information does not exist in a very small section where information pits do not exist. Therefore, by detecting only the section where information pits exist and using it to generate a wobble signal, it becomes possible to substantially improve the signal S/N.

Figure 8:
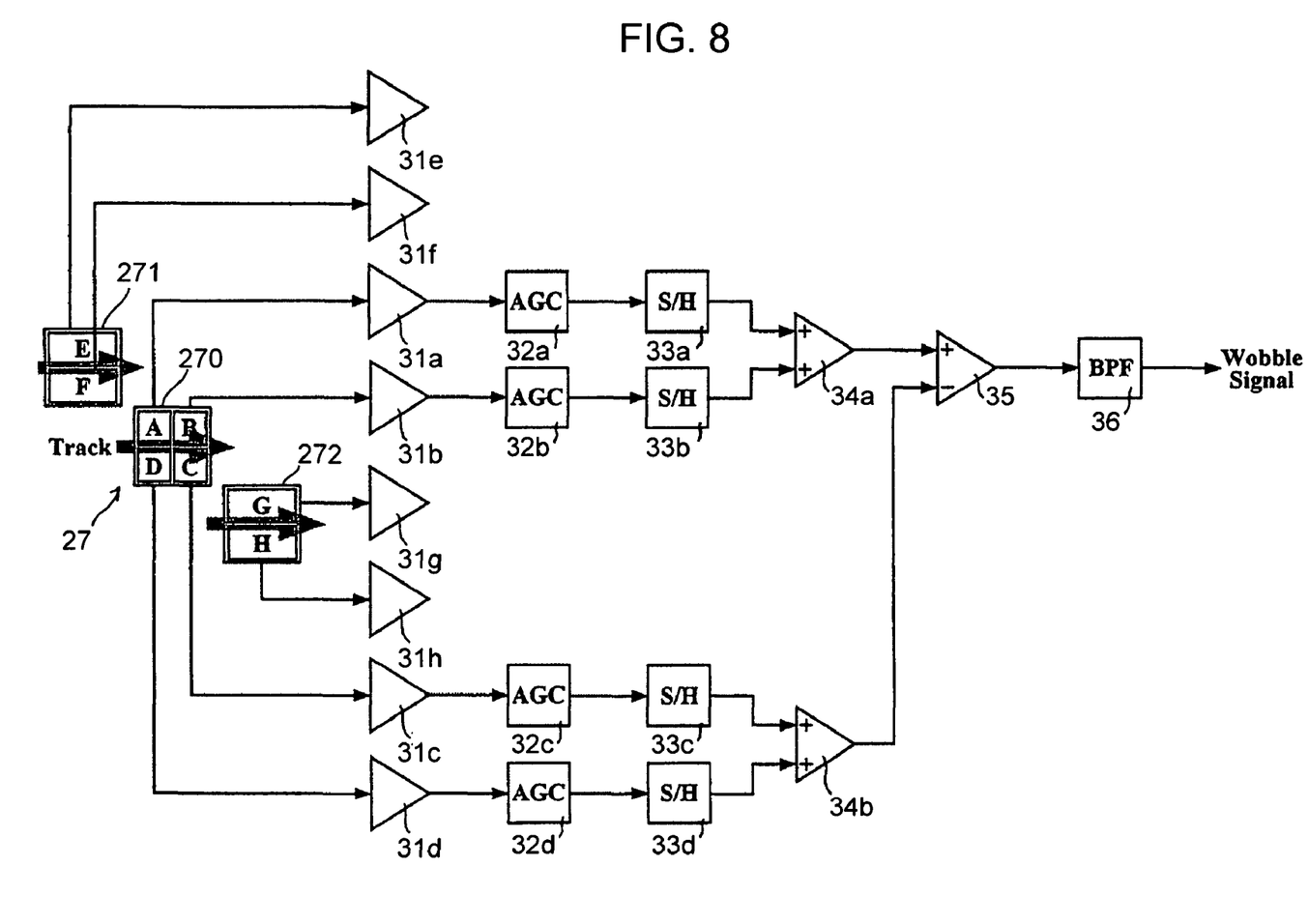
FIG. 8 is a block diagram showing an example of the configuration of an optical pickup for detecting a wobble signal in the optical disc recording and playback apparatus shown in FIG. 1.

FIG. 8 is a block diagram showing the configuration in this case, where components identical to those shown in FIG. 2 are designated with the same reference numerals.

In general, when information pits exist, the reflectivity decreases. Therefore, in this example, there is provided a mechanism (sample and hold circuits 33a to 33d) for observing output variations of the light-receiving areas A to D and for sampling and holding a wobble signal at the instant when the signal obtained when the light collection spot passes through each pit becomes a minimum.

More specifically, in FIG. 8, the mechanism is realized in such a way that the outputs of the AGC circuits 32a to 32d are input to the sample and hold circuits 33a to 33d, the outputs of the sample and hold circuit 33a and the sample and hold circuit 33b are added together using the operational amplifier 34a, thereafter the signal such that the outputs of the sample and hold circuit 33c and the sample and hold circuit 33d are added together using the operational amplifier 34b is subtracted therefrom (the operational amplifier 35 is used), and the output is made to pass through the band-pass filter 36 for allowing only the wobble signal to pass through.

Furthermore, when a continuous groove is wobbled, it is possible to sample and hold only the section in which recording marks do not exist and improve S/N by using the identical technique.

Next, a description is given of a method of detecting a track control error signal using a differential push-pull detection method (DPP).

Figure 9:
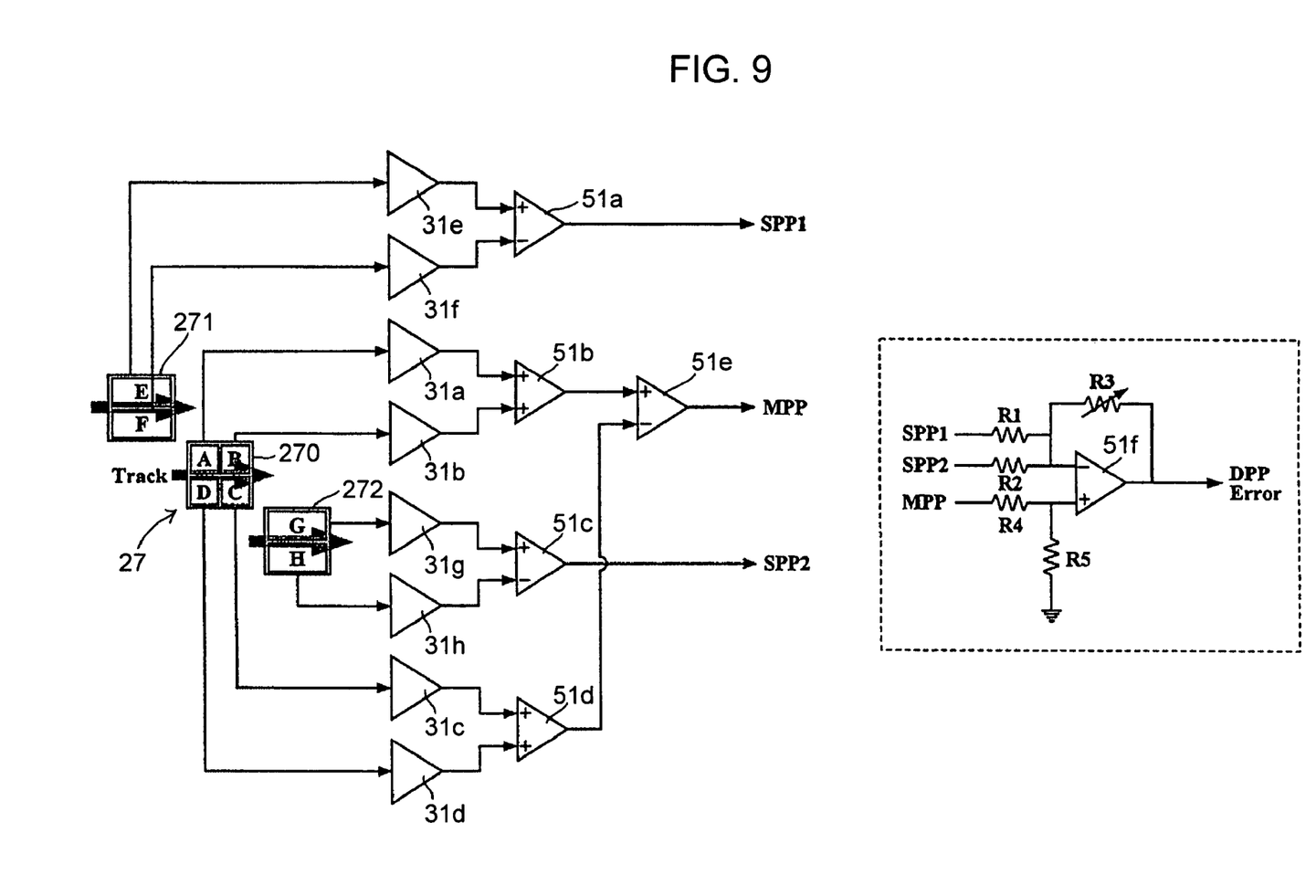
FIG. 9 is a block diagram showing an example of the configuration of an optical pickup for detecting a DPP signal in the optical disc recording and playback apparatus shown in FIG. 1.

As shown in FIG. 9, operational amplifiers 51a to 51f are provided with respect to the head amplifier outputs 31a to 31d of the light-receiving areas A to D, and the following computations are performed.

Initially, by performing a computation shown in the following equation (1), a push-pull signal (MPP) is obtained.

$$MPP = (A+B) - (C+D) \quad (1)$$

Similarly, as a result of performing computations shown in the following equations (2) and (3) on the sub-beams, which are reflected light of the +1st order diffraction light and the −1st order diffraction light, push-pull signals SPP1 and SPP2 of the sub-beams are obtained.

$$SPP1 = E - F \quad (2)$$

$$SPP2 = G - H \quad (3)$$

By performing a computation shown in equation (4) on the output signals of the above (1) to (3), a differential push-pull error signal DPP can be detected.

$$DPP = MPP - k \cdot (SPP1 + SPP2) \quad (4)$$

The value of k in equation (4) can be set to any desired value, for example, by varying the resistance value of the variable resistor R3 of the operational amplifier 51f.

The track error signal using the phase difference method, obtained by the configuration shown in FIGS. 2 and 3, can be obtained basically only when pit information or recording marks exist. Therefore, when a read-only (ROM) disc is to be played back or only when the area where pit information exists and the area where the signal has already been recorded is to be played back in the case of a recordable optical disc, an error signal can be generated.

That is, in this embodiment, when information pits or recording marks do not exist, tracking control is performed using the differential push-pull method. When information pits or recording marks exist, tracking control is performed using either the phase difference method or the differential push-pull method.

For example, in the area where information pits exist, both track error signals are compared each time, and the detection method with a larger signal amplitude should be selected. The playback RF signal in this embodiment is obtained as the total sum of the four-division light-receiving element, and the focus error signal is obtained as astigmatism. Therefore, it can be detected by performing computations shown in equations (5) and (6) on the outputs of the head amplifiers 31a to 31d of the light-receiving areas A to D.

$$RF = A + B + C + D \quad (5)$$

$$FE = (A+C) - (B+D) \quad (6)$$

Next, with reference to FIG. 1, a description is given of the overall configuration of the optical disc recording and playback apparatus to which this embodiment is applied. In FIG. 1, the above-described computation circuits for detecting each error signal and a sum signal are correspondingly represented by blocks 81, 82, 83, and 84.

Then, the playback RF signal obtained by the computation of equation (5) is waveform-equalized by an equalizer amplification section (RF EQ) 60, and thereafter is supplied to the signal processing system indicated by the blocks 81, 82, 83, and 84.

A DSP (Digital Signal Processor) 65 controls the operation of the entire optical disc recording and playback apparatus and also controls a driving circuit 70 of a spindle motor 71, and at the same time has main functions for focus control of the optical system and tracking control.

Each computation output is converted into digital signal in A/D converters 61, 62, 63, and 64, and in a DSP 65, gain adjustments and phase compensation for focus control and tracking control are performed. After the output of the DSP 65 is converted into an analog signal by D/A converters 66 and 67, the output is amplified to a necessary signal amplitude in amplifiers 68 and 69, and is used to drive the two-axis electromagnetic actuator 15 mounted in the optical pickup 10 in order to control the lens position. The control of a liquid-crystal device 23, which is a spherical-aberration correction element, is performed in an LC control section 72, and the driving signal is transmitted to the optical pickup 10 via an amplifier 73.

As has thus been described, according to this embodiment, in an optical disc in which a track address and time information for generating a clock signal are superposed in advance by forming a groove portion in such a manner as to be wobbled, influences due to information pits and recording marks can be eliminated and the wobble signal can be reliably detected. Furthermore, when a watermark, such as copyright information, for which superposition becomes possible by making an information pit sequence formed by continuity of intermittent information pits wobble is to be read, and the wobble signal is reliably detected by eliminating influences due to information pits and recording marks.

In an optical disc recording medium used in the present invention, preferably, the depth of the pits and grooves in which related information is attached by wobbles is set in the range of $\lambda/10n$ to $\lambda/4n$ ($\lambda$ is the wavelength of the light source, n is the reflectivity of the light transparent protective layer), so that the signal quality of all the pit playback signal, the wobble signal, and the track control error signal falls within the range that does not pose any problems in practical terms.

In the description of the embodiments, lenses of a two-group arrangement are used as an embodiment of objective lenses having a high aperture number. However, identical functions can be realized by a single lens. Furthermore, the present invention can also be applied to an optical disc recording and playback apparatus of the related art, such as a CD and a DVD.

It should be understood by those skilled in the art that various modifications, combinations, sub-combinations and alterations may occur depending on design requirements and other factors insofar as they are within the scope of the appended claims or the equivalents thereof.

What is claimed is:

1. An optical disc recording and playback apparatus comprising:
   an optical pickup performing an operation for recording and playing back signal information into and from an optical disc;
   an optical element allowing a light beam irradiated onto an optical disc by the optical pickup to be split into a main beam and sub-beams on both sides of the main beam and supplying the beams to the optical disc;
   an optical detector detecting return light from the optical disc;
   a control circuit performing tracking using a differential push-pull method when information pits or recording marks within the track control error signal do not exist, and performing tracking by comparing a differential push-pull track error signal and a phase difference track error signal to determine which one has a larger signal amplitude and selecting the one with the larger signal amplitude when information pits or recording marks within the track control error signal exist; and a computation circuit detecting a track control error signal by a phase difference method and a differential push-pull method by using the detection signal from the optical detector and also detecting a wobble signal, wherein the optical detector includes a four-division light-receiving element detecting return light of the main beam by light-receiving areas divided at least in a direction tangent to the tracks of the optical disc and in the radial direction of the optical disc, and two two-division light-receiving elements, disposed on both sides of the four-division light-receiving element, detecting return light of the sub-beams by the light-receiving areas divided at least in the direction tangent to the tracks, the computation circuit includes normalization means normalizing a pit playback signal from each light-receiving area in the four-division light-receiving element of the optical detector to a fixed value, and computes the wobble signal and a track control error signal by the phase difference method by using the normalized pit playback signals, the computation circuit computes the wobble signal by detecting the presence of information pits or recording marks previously formed on the optical disc and by sampling only the detected information pits or only the detected recording marks in the signal received by the four-division light-receiving element, and the detected recording marks exclude spaces between the detected recording marks or between the detected information pits.

2. The optical disc recording and playback apparatus according to claim 1, wherein the normalization means performs normalization so that the signal amplitude of the pit playback signal corresponding to each light-receiving area of the four-division light-receiving element becomes a fixed value.

3. The optical disc recording and playback apparatus according to claim 1, wherein the normalization means performs normalization so that a light-receiving intensity in each light-receiving area of the four-division light-receiving element becomes a fixed value.

4. The optical disc recording and playback apparatus according to claim 1, wherein, in the optical disc, when the light-source wavelength of the light beam is denoted as $\lambda$ and the reflectivity of a light transparent protective layer of the optical disc is denoted as n, the depth of information pits and grooves to which related information is attached by the wobble is set in the range of $\lambda/8n$ to $\lambda/4n$.

5. A signal detection method for use with an optical disc recording and playback apparatus including an optical pickup performing an operation for recording and playing back signal information into and from an optical disc, an optical element allowing a light beam irradiated onto an optical disc by the optical pickup to be split into a main beam and sub-beams on both sides of the main beam and supplying the beams to the optical disc, an optical detector detecting return light from the optical disc, and a computation circuit detecting a track control error signal by a phase difference method and a differential push-pull method by using the detection signal from the optical detector and also detecting a wobble signal, wherein the optical detector includes a four-division light-receiving element detecting return light of the main beam by light-receiving areas divided at least in a direction tangent to the tracks of the optical disc and in the radial direction of the optical disc, and two two-division light-receiving elements, disposed on both sides of the four-division light-receiving element, detecting return light of the sub-beams by the light-receiving areas divided at least in the direction tangent to the tracks, the signal detection method comprising:

normalizing a pit playback signal from each light-receiving area in the four-division light-receiving element of the optical detector to a fixed value;

computing a track control error signal on the basis of the wobble signal and the phase difference method by using the normalized pit playback signals, wherein, the wobble signal is computed by detecting the presence of information pits or recording marks previously formed on the optical disc and by sampling only the detected information pits or only the detected recording marks in the signal received by the four-division light-receiving element, the detected recording marks excluding spaces between the detected recording marks or between the detected information pits;

performing tracking by using a differential push-pull method when information pits or recording marks within the track control error signal do not exist; and performing tracking by comparing a differential push-pull track error signal and a phase difference track error signal to determine which one has a larger signal amplitude and selecting the one with the larger signal amplitude when information pits or recording marks within the track control error signal exist.

6. The signal detection method according to claim 5, wherein, in the normalization, normalization is performed so that the signal amplitude of the pit playback signal corresponding to each light-receiving area of the four-division light-receiving element becomes a fixed value.

7. The signal detection method according to claim 5, wherein, in the normalization, normalization is performed so that a light-receiving intensity in each light-receiving area of the four-division light-receiving element becomes a fixed value.

8. The signal detection method according to claim 5, wherein, in the optical disc, when the light-source wavelength of the light beam is denoted as $\lambda$ and the reflectivity of a light transparent protective layer of the optical disc is denoted as n, the depth of information pits and grooves to which related information is attached by the wobble is set in the range of $\lambda/8n$ to $\lambda/4n$.

* * * * *